United States Patent
Kuroki

(10) Patent No.: US 8,896,723 B2
(45) Date of Patent: Nov. 25, 2014

(54) IMAGE PROCESSING APPARATUS, METHOD, AND PROGRAM TO CALCULATE A PIXEL VALUE OF EACH PIXEL IN A BINNING AREA

(71) Applicant: Sony Corporation, Tokyo (JP)

(72) Inventor: Yoshihiko Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 13/770,017

(22) Filed: Feb. 19, 2013

(65) Prior Publication Data

US 2013/0235238 A1    Sep. 12, 2013

(30) Foreign Application Priority Data

Mar. 7, 2012 (JP) .................. 2012-050212

(51) Int. Cl.
- *H04N 5/235* (2006.01)
- *H04N 5/357* (2011.01)
- *H04N 3/14* (2006.01)
- *H04N 5/347* (2011.01)

(52) U.S. Cl.
CPC ............. *H04N 3/1568* (2013.01); *H04N 5/357* (2013.01); *H04N 5/347* (2013.01)
USPC ...................... 348/230.1; 348/311

(58) Field of Classification Search
USPC ............................. 348/241, 294, 230.1, 311
See application file for complete search history.

(56) References Cited

U.S. PATENT DOCUMENTS

| | | | |
|---|---|---|---|
| 8,675,122 B2 * | 3/2014 | Kroepfl et al. | 348/362 |
| 2006/0119724 A1 * | 6/2006 | Inuiya | 348/311 |
| 2009/0219387 A1 * | 9/2009 | Marman et al. | 348/143 |
| 2011/0096179 A1 * | 4/2011 | Border et al. | 348/208.4 |

FOREIGN PATENT DOCUMENTS

JP    2007-274064 A    10/2007

* cited by examiner

*Primary Examiner* — Ngoc-Yen Vu

(74) *Attorney, Agent, or Firm* — Wolf, Greenfield & Sacks, P.C.

(57) ABSTRACT

Provided is an image processing apparatus including a binning unit configured to calculate, based on, as a binning area, an area including two or more adjacent pixels in a unit area including m pixels in a lateral direction and n pixels in a perpendicular direction on an image sensor, a sum of output values of the pixels in the binning area as an addition output value for each of m×n binning areas that are different to each other; and a calculation unit configured to calculate a pixel value of each pixel in the binning area based on m×n addition output values obtained for the unit area.

12 Claims, 5 Drawing Sheets

FIG. 1
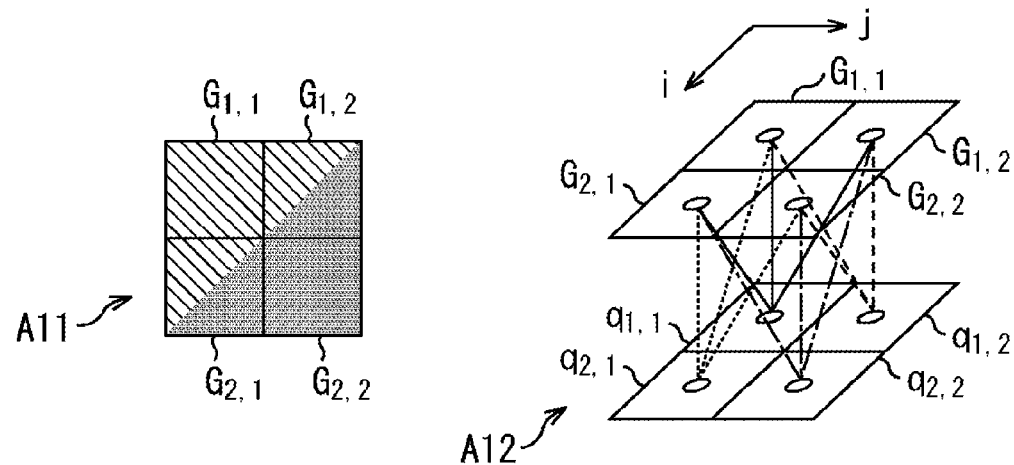
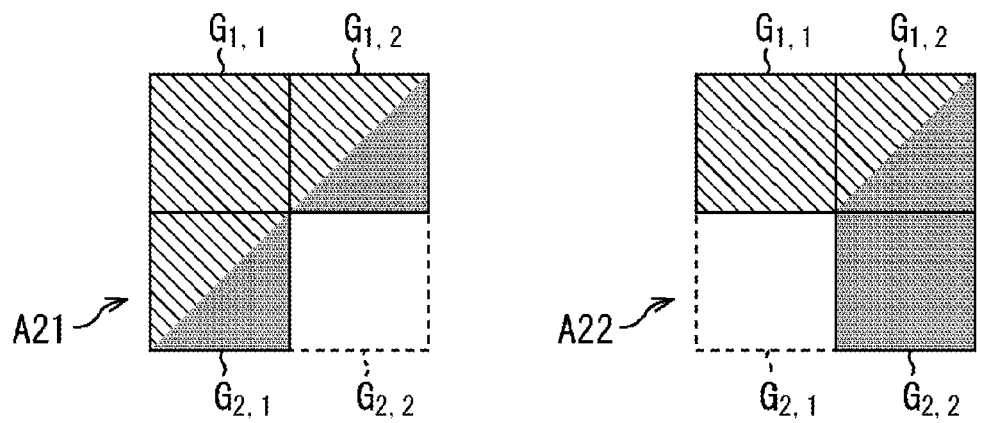
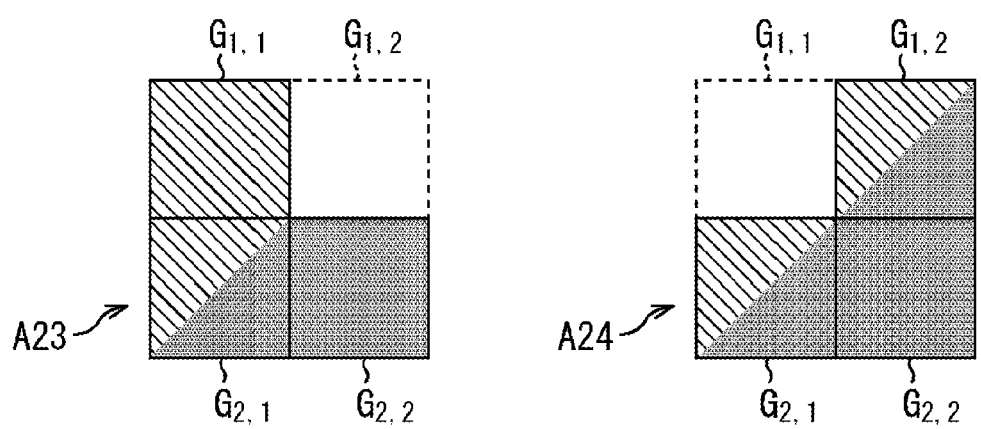

IMAGE PROCESSING APPARATUS, METHOD, AND PROGRAM TO CALCULATE A PIXEL VALUE OF EACH PIXEL IN A BINNING AREA

BACKGROUND

The present technology relates to an image processing apparatus, method, and program, and more specifically, to an image processing apparatus, method, and program capable of reducing noise more simply.

Recently, due to market demands for higher resolution, smaller size, and lower cost, the pixels in an image sensor have been becoming more miniature. For example, if about 8,000 pixels are arranged on an image sensor with a width in the lateral direction of 8 mm, the pixel pitch, namely, the interval or width between pixels, is about 1 µm.

Thus, as the pixel pitch on the image sensor becomes smaller, the image signal S/N ratio (signal to noise ratio) obtained by the image sensor deteriorates, so that the quality of image deteriorates.

In view of this, a technology has been proposed for removing the noise component inherent in the imaging apparatus from an image during image capture by capturing an image for noise component removal and determining in advance the noise component from that image (e.g., JP 2007-274064A).

SUMMARY

However, in the above-described technology, if the noise component included in the image signal varies due to the imaging conditions and the like, noise can no longer be sufficiently reduced. Further, in the above-described technology, since circuits are required for the extraction, recording, and removal of the noise component, the configuration of the imaging apparatus becomes complex.

According to an embodiment of the present technology, which was made in view of such circumstances, noise can be reduced more simply.

According to an embodiment of the present disclosure, there is provided an image processing apparatus including a binning unit configured to calculate, based on, as a binning area, an area including two or more adjacent pixels in a unit area including m pixels in a lateral direction and n pixels in a perpendicular direction on an image sensor, a product of output values of the pixels in the binning area as an addition output value for each of m×n binning areas that are different to each other, and a calculation unit configured to calculate a pixel value of each pixel in the binning area based on m×n addition output values obtained for the unit area.

The calculation unit may be configured to calculate the pixel value of each pixel in the unit area by calculating q=wp, where a matrix obtained by arranging the m×n addition output values is q, a matrix obtained by arranging the pixel value of each pixel in the unit area is p, and a matrix obtained by arranging a weighting of each pixel in the unit area is w.

The calculation unit may be configured to calculate the pixel value of each pixel in the unit area by calculating p=w$^{-1}$q, where w$^{-1}$ is an inverse matrix of the matrix w.

The matrix w may be a matrix obtained by setting a weighting of pixels used to determine the addition output values as 1, and a weighting of pixels not used to determine the addition output values as 0.

The binning unit may be configured to calculate the sum of digitized output values of the pixels as the addition output value.

According to an embodiment of the present disclosure, there is provided an image processing method or a program including calculating, based on an area including two or more adjacent pixels in a unit area including m pixels in a lateral direction and n pixels in a perpendicular direction on an image sensor as a binning area, a sum of output values of the pixels in the binning area as an addition output value for each of m×n binning areas that are different to each other, and calculating a pixel value of each pixel in the binning area based on m×n addition output values obtained for the unit area.

According to an embodiment of the present disclosure, based on an area including two or more adjacent pixels in a unit area including m pixels in a lateral direction and n pixels in a perpendicular direction on an image sensor as a binning area, a sum of output values of the pixels in the binning area may be calculated as an addition output value for each of m×n binning areas that are different to each other, and a pixel value of each pixel in the binning area may be calculated based on m×n addition output values obtained for the unit area.

According to an aspect of the present technology, noise can be reduced more simply.

BRIEF DESCRIPTION OF THE DRAWINGS

FIG. 1 is a diagram illustrating binning and restoration of a pixel value;

DETAILED DESCRIPTION OF THE EMBODIMENT(S)

Figure 2:
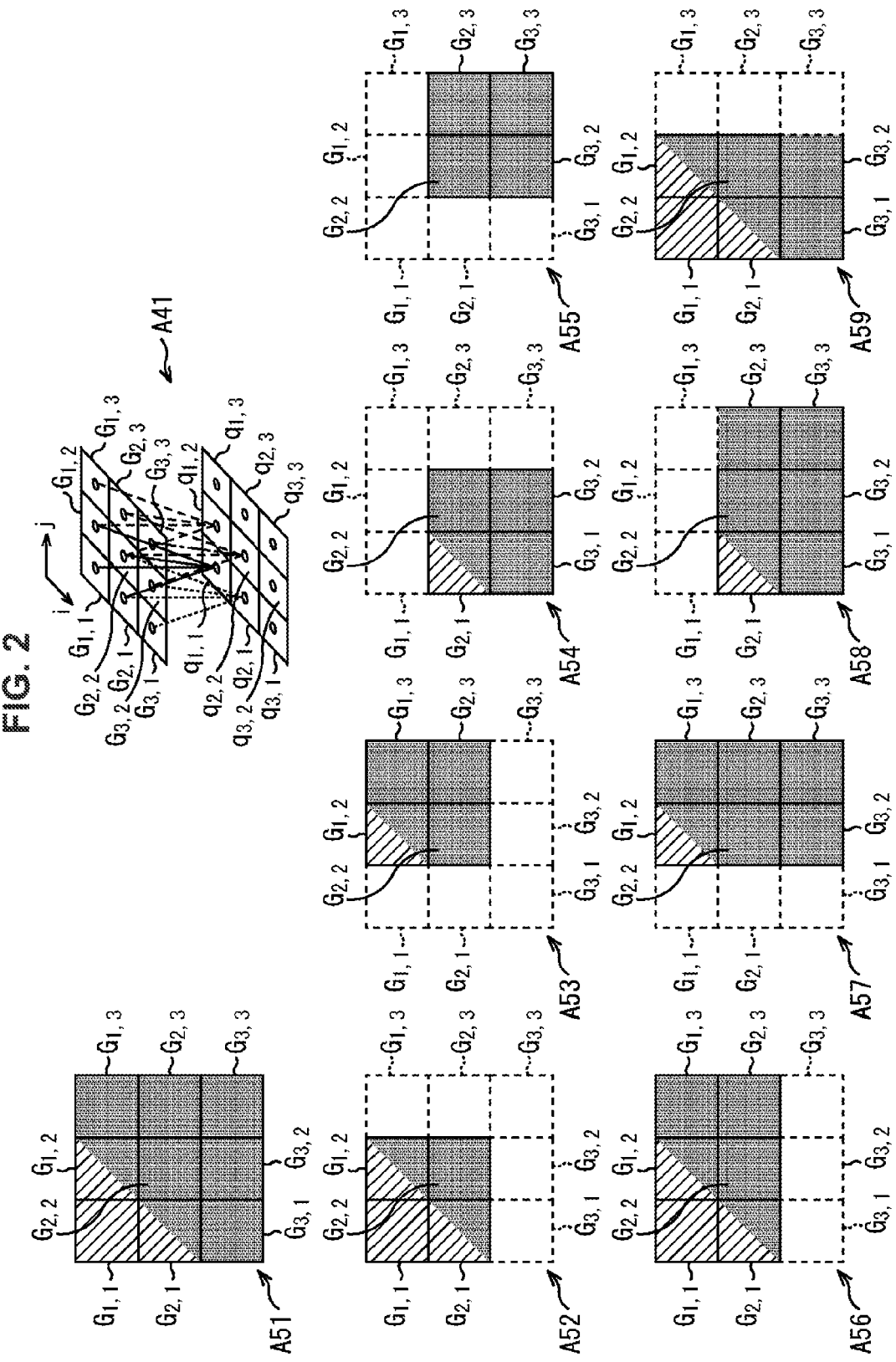
FIG. 2 is a diagram illustrating binning and restoration of a pixel value.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

An embodiment to which the present technology is applied will now be described with reference to the drawings.
(First Embodiment)
[Binning and Pixel Value Restoration]

The present technology reduces image signal noise more simply by restoring a pixel value of each pixel based on an addition output value obtained by adding the output value of several pixels on a light-receiving surface of an image sensor, for example.

As indicated by arrow A11 in FIG. 1, an area including pixels $G_{1,1}$, $G_{1,2}$, $G_{2,1}$, and $G_{2,2}$, which are arranged adjacent to each other on the light-receiving surface of the image sensor, will be referred to as a unit area, and the ultimately output image will be referred to as an output image, for example.

In the present technology, as indicated by arrow A12, for example, the pixel value $p_{i,j}$ of a pixel $G_{i,j}$ (wherein i=1 to 2, and j=1 to 2) on the a sensor layer, namely, the unit area, is calculated based on the addition output value $q_{i,j}$ (wherein i=1 to 2, and j=1 to 2) of the addition output layer. Note that in the drawings, the vertical direction may also be referred to as the perpendicular direction (i direction), and the horizontal direction may also be referred to as the lateral direction (j direction).

More specifically, in the present technology, an area including two or more pixels adjacent to each other in a unit area of the image sensor is referred to as a binning area, and the sum of the output values (pixel values) of the pixels in a binning area is referred to as the addition output value of that binning area. Further, the ultimate pixel value of each pixel in the unit area is calculated based on the addition output value of a plurality of binning areas.

For example, as indicated by arrow A21, an area including the three pixels $G_{1,1}$, $G_{1,2}$, and $G_{2,1}$ that are adjacent to each other among the four pixels in the unit area is one binning area, and the sum of the pixel values of these three pixels is the addition output value $q_{1,1}$.

Further, as indicated by arrow A22, an area including the three pixels $G_{1,1}$, $G_{1,2}$, and $G_{2,2}$ that are adjacent to each other among the four pixels in the unit area is one binning area, and the sum of the pixel values of these three pixels is as addition output value $q_{1,2}$.

In addition, as indicated by arrow A23, an area including the three pixels $G_{1,1}$, $G_{2,1}$, and $G_{2,2}$ that are adjacent to each other among the four pixels in the unit area is one binning area, and the sum of the pixel values of these three pixels is addition output value $q_{2,1}$.

Similarly, as indicated by arrow A24, an area including the three pixels $G_{1,2}$, $G_{2,1}$, and $G_{2,2}$ that are adjacent to each other among the four pixels in the unit area is one binning area, and the sum of the pixel values of these three pixels is addition output value $q_{2,2}$.

Based on the thus-obtained four addition output values for one unit area, addition output values $q_{1,1}$, $q_{1,2}$, $q_{2,1}$, and $q_{2,2}$, the pixel value of each pixel in the unit area to be ultimately obtained can be determined. Namely, the pixel value $p_{1,1}$ of the pixel $G_{1,1}$, the pixel value $p_{1,2}$ of the pixel $G_{1,2}$, the pixel value $p_{2,1}$ of the pixel $G_{2,1}$, and the pixel value $p_{2,2}$ of the pixel $G_{2,2}$ in the unit area are calculated.

For example, among the respective areas on the image sensor indicated by arrows A11 and A21 to A24, the hatched areas are areas where light is incident, and the non-hatched areas are areas where light is not incident. In this example, light is incident on the whole area of pixel $G_{1,1}$ and on half of the areas of pixels $G_{1,2}$ and $G_{2,1}$, respectively.

Therefore, as can be seen from the respective pixels in the unit area indicated by arrow A21, the addition output value $q_{1,1}$ is the value of the light components incident on pixels $G_{1,1}$, $G_{1,2}$, and $G_{2,1}$. Further, as can be seen from the respective pixels in the unit area indicated by arrow A22, the addition output value $q_{1,2}$ is the value of the light components incident on pixels $G_{1,1}$ and $G_{1,2}$.

Similarly, as can be seen from the respective pixels in the unit area indicated by arrow A23, the addition output value $q_{2,1}$ is the value of the light components incident on pixels $G_{1,1}$ and $G_{2,1}$. In addition, as can be seen from the respective pixels in the unit area indicated by arrow A24, the addition output value $q_{2,2}$ is the value of the light components incident on pixels $G_{1,2}$ and $G_{2,1}$.

Further, using the respective addition output value $q_{i,j}$ (wherein i=1 to 2, and j=1 to 2), the respective pixel value $p_{i,j}$ can be obtained.

Specifically, the simultaneous equation shown in the following formula (1) can be obtained from the respective addition output value $q_{i,j}$ (wherein i=1 to 2, and j=1 to 2).

[Formula 1]

$$q_{1,1} = w_{11}p_{1,1} + w_{12}p_{1,2} + w_{13}p_{2,1} + w_{14}p_{2,2}$$

$$q_{1,2} = w_{21}p_{1,1} + w_{22}p_{1,2} + w_{23}p_{2,1} + w_{24}p_{2,2}$$

$$q_{2,1} = w_{31}p_{1,1} + w_{32}p_{1,2} + w_{33}p_{2,1} + w_{34}p_{2,2}$$

$$q_{2,2} = w_{41}p_{1,1} + w_{42}p_{1,2} + w_{43}p_{2,1} + w_{44}p_{2,2} \quad (1)$$

In formula (1), each addition output value $q_{i,j}$ gives the same weighting to the pixel value $p_{i,j}$ for all of the pixels in the unit area. $w_{s,t}$ (wherein s=1 to 4, and t=1 to 4) in formula (1) represents the weighting for the pixel value $p_{i,j}$ of each pixel.

Specifically, when pixel $G_{i,j}$ is used in the calculation of addition output value $q_{i,j}$, the weighting $w_{s,t}$ for the pixel value of that pixel $G_{i,j}$ is set as "1", and when pixel $G_{i,j}$ is not used in the calculation of addition output value $q_{i,j}$, the weighting $w_{s,t}$ for the pixel value $p_{i,j}$ of that pixel $G_{i,j}$ is set as "0".

In other words, if a pixel $G_{i,j}$ is included in the binning area for determining the addition output value $q_{i,j}$, the weighting $w_{s,t}$ of the pixel value $p_{i,j}$ is set as "1", and if a pixel $G_{i,j}$ is not included in the binning area, the weighting $w_{s,t}$ of the pixel value $p_{i,j}$ is set as "0".

Specifically, since all of the pixels except for pixel $G_{2,2}$ are used in the calculation of addition output value $q_{1,1}$, for example, the weighting $w_{1,1}$ of pixel $G_{1,1}$, the weighting $w_{1,2}$ of pixel $G_{1,2}$, and the weighting $w_{1,3}$ of pixel $G_{2,1}$ are "1", and the weighting $w_{1,4}$ of pixel $G_{2,2}$ is "0".

By solving such a simultaneous equation shown in formula (1), the pixel value of each pixel in the unit area can be obtained. For example, when solving the simultaneous equation of formula (1), the pixel value $p_{i,j}$ of each pixel can be easily obtained by performing a matrix calculation.

Specifically, a matrix obtained by arranging the weighting $w_{s,t}$ shown in formula (1) as shown in the following formula (2) is used as a weighting matrix w.

[Formula 2]

$$\begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} = \begin{bmatrix} 1 & 1 & 1 & 0 \\ 1 & 1 & 0 & 1 \\ 1 & 0 & 1 & 1 \\ 0 & 1 & 1 & 1 \end{bmatrix} = w \quad (2)$$

Further, the matrix (horizontal vector) obtained by arranging the addition output values $q_{i,j}$ in order is used as a matrix q. For example, in formula (1), the horizontal vector in which the addition output values $q_{1,1}$, $q_{1,2}$, $q_{2,1}$, and $q_{2,2}$ are arranged in order is used as the matrix q.

In addition, the horizontal vector obtained by arranging the pixel values $p_{i,j}$ in order is used as a matrix p. For example, in formula (1), the horizontal vector in which the pixel values $p_{1,1}$, $p_{1,2}$, $p_{2,1}$, and $p_{2,2}$ are arranged in order is used as the matrix p.

Using the matrix p, matrix q, and weighting matrix w, formula (1) can be expressed as the following formula (3).

[Formula 3]

$$q = wp \quad (3)$$

In addition, formula (4) can be obtained by multiplying formula (3) by matrix $w^{-1}$, which is the inverse matrix of the weighting matrix w.

[Formula 4]

$$p = w^{-1}q \quad (4)$$

Therefore, the ultimate pixel value $p_{i,j}$ of each pixel in the unit area, which is the target value, can be obtained from formula (4). More specifically, using formula (2), formula (4) can be calculated as the following formula (5).

[Formula 5]

$$p_{1,1} = -q_{1,1} + q_{1,2} + q_{2,1} - \tfrac{2}{3}(-2q_{1,1} + q_{1,2} + q_{2,1} + q_{2,2})$$

$$p_{1,2} = q_{1,1} - q_{2,1} + \tfrac{1}{3}(-2q_{1,1} + q_{1,2} + q_{2,1} + q_{2,2})$$

$$p_{2,1} = q_{1,1} - q_{1,2} + \tfrac{1}{3}(-2q_{1,1} + q_{1,2} + q_{2,1} + q_{2,2})$$

$$p_{2,2} = \tfrac{1}{3}(-2q_{1,1} + q_{1,2} + q_{2,1} + q_{2,2}) \quad (5)$$

Note that during an actual calculation, the value substituted for pixel value $p_{i,j}$ in formula (1) is the output value actually output from the pixel, and that the pixel value $p_{i,j}$ calculated in formula (5) is the pixel value of the pixel that was restored by the calculation, namely, the pixel value of the pixel that is to be ultimately obtained.

Further, each element in the weighting matrix w is set as "1" or "0" based on whether the target pixel is used in the calculation of the addition output value, namely, whether that pixel is in the binning area. Consequently, when determining the pixel value $p_{i,j}$ of each pixel in the binning area based on the calculation of formula (4), the combination of the pixels forming the binning area in the unit area needs to be a combination in which the weighting matrix x is an inverse matrix. Namely, the combination of the pixels forming each binning area can be determined so that the weighting matrix w is a non-specific matrix.

Thus, by using the sum of the output values of the pixels in a binning area including a plurality of pixels as an addition output value, and determining the ultimate pixel value of each pixel based on a calculation from a plurality of addition output values, image signal noise can be reduced based on a simpler configuration and a simpler calculation.

For example, since the shot noise included in an image captured by an image sensor, namely, the image signal of the image, increases if the size of the image sensor pixels is reduced (number of pixels is increased), the image signal S/N ratio deteriorates. In this case, the dominant noise included in the image signal will be shot noise.

Shot noise occurs due to increased statistical variation in the number of photons (particles) when the number of particles incident on the image sensor is small. The magnitude of shot noise is proportional to the mean of the current (light intensity). Further, the number of photons detected over a given time has a Poisson distribution centered at this mean. From the properties of a Poisson distribution, the standard deviation of photon noise is equal to the square root of the number of photons.

From such properties of shot noise, if the output value of a plurality of pixels is read as an addition output value, like in the present technology, the apparent pixel pitch increases. Consequently, the noise component included in the signal (addition output value) decreases, and the S/N ratio improves. Namely, although a biased shot noise component is included in the output value of each pixel, if these pixel output values are taken as the addition output value, the noise component of the respective output values averages out. Consequently, the signal component included in the addition output value can be relatively increased, which enables the S/N ratio to be improved.

By binning a plurality of pixels in this manner, the noise component in the addition output value is reduced, so that if the pixel value of each pixel is calculated (restored) from such an addition output value with reduced noise, the S/N ratio can be improved more than when the pixel value of each pixel is directly read.

Further, with binning, since the apparent pixel pitch increases, a higher resolution image can be obtained compared with when the pixel value of each pixel is directly read, even if there is a large number of pixels on the image sensor, which can make resolution more difficult due to the diffraction limit. For example, in the example illustrated in FIG. 1, compared with when the pixel value of each pixel is directly read, the apparent pixel pitch, namely, the width of the binning area, approximately doubles in both the lateral and the perpendicular directions. The present technology is especially preferred when the pitch of the pixels on the image sensor is 4 µm or less.

In the above, as described with reference to FIG. 1, a case was described in which a 2 pixel×2 pixel area was the unit area. However, the unit area may be any area, as long as it is formed from adjacent pixels.

To generalize, the unit area may be an area including m pixels in the lateral direction and n pixels in the perpendicular direction of the image sensor. In this case, m×n binning areas for the unit area is determined. The combination of the pixels forming the binning area may be any combination, as long as the combination combines 2 or more pixels adjacent to each other in the unit area. Further, the unit area may be a rectangular area.

However, when determining the pixel value of each pixel based on a calculation performed using formula (4), the combinations of pixels forming each binning area need to be a combination in which the weighting matrix w is a non-specific matrix.

For example, as the unit area of m pixels×n pixels, if a 3 pixel×3 pixel area is the unit area, as indicated by arrow A41 in FIG. 2, in such a case the pixel value $p_{i,j}$ that is the ultimate determination target of the pixel $G_{i,j}$ on the sensor layer, namely, the unit area, is calculated based on the addition output value $q_{i,j}$ (wherein i=1 to 3, and j=1 to 3) of the addition output layer.

Note that in the following, parts in FIG. 2 that correspond to the case illustrated in FIG. 1 are denoted using the same reference numerals, and a description thereof is omitted as appropriate. Further, in FIG. 2, the horizontal direction and the vertical direction represent the perpendicular direction (i direction) and the lateral direction (j direction), respectively.

Thus, when a 3 pixel×3 pixel area serves as the unit area, as indicated by arrows A51 to A59, 9 (=3×3) binning areas are determined for the unit area, and the addition output value of each binning area is read.

Namely, as indicated by arrow A51 for example, an area including all 9 pixels in the unit area is the binning area, and the sum of the pixel values of these 9 pixels is the addition output value $q_{1,1}$. Here, the 9 pixels in the unit area are pixels $G_{1,1}$, $G_{1,2}$, $G_{1,3}$, $G_{2,1}$, $G_{2,2}$, $G_{2,3}$, $G_{3,1}$, $G_{3,2}$, and $G_{3,3}$.

Further, as indicated by arrow A52 for example, of the 9 pixels in the unit area, an area including the four pixels $G_{1,1}$, $G_{1,2}$, $G_{2,1}$, and $G_{2,2}$ that are adjacent to each other is the binning area, and the sum of the pixel values of these pixels is the addition output value $q_{1,2}$.

In addition, as indicated by arrow A53 for example, of the 9 pixels in the unit area, an area including the four pixels $G_{1,2}$, $G_{1,3}$, $G_{2,2}$, and $G_{2,3}$ that are adjacent to each other is the binning area, and the sum of the pixel values of these pixels is the addition output value $q_{1,3}$.

As indicated by arrow A54 for example, of the 9 pixels in the unit area, an area including the four pixels $G_{2,1}$, $G_{2,2}$, $G_{3,1}$, and $G_{3,2}$ that are adjacent to each other is the binning area, and the sum of the pixel values of these pixels is the addition output value $q_{2,1}$.

Further, as indicated by arrow A55 for example, of the 9 pixels in the unit area, an area including the four pixels $G_{2,2}$, $G_{2,3}$, $G_{3,2}$, and $G_{3,3}$ that are adjacent to each other is the binning area, and the sum of the pixel values of these pixels is the addition output value $q_{2,2}$.

In addition, as indicated by arrow A52 for example, of the 9 pixels in the unit area, an area including the six pixels $G_{1,1}$, $G_{1,2}$, $G_{1,3}$, $G_{2,1}$, $G_{2,2}$, and $G_{2,3}$ that are adjacent to each other is the binning area, and the sum of the pixel values of these pixels is the addition output value $q_{2,3}$.

As indicated by arrow A57 for example, of the 9 pixels in the unit area, an area including the six pixels $G_{1,2}$, $G_{1,3}$, $G_{2,2}$, $G_{2,3}$, $G_{3,2}$, and $G_{3,3}$ that are adjacent to each other is the binning area, and the sum of the pixel values of these pixels is the addition output value $q_{3,1}$.

As indicated by arrow A58 for example, of the 9 pixels in the unit area, an area including the six pixels $G_{2,1}$, $G_{2,2}$, $G_{2,3}$, $G_{3,1}$, $G_{3,2}$, and $G_{3,3}$ that are adjacent to each other is the binning area, and the sum of the pixel values of these pixels is the addition output value $q_{3,2}$.

Further, as indicated by arrow A59 for example, of the 9 pixels in the unit area, an area including the six pixels $G_{1,1}$, $G_{1,2}$, $G_{2,1}$, $G_{2,2}$, $G_{3,1}$, and $G_{3,2}$ that are adjacent to each other is the binning area, and the sum of the pixel values of these pixels is the addition output value $q_{3,3}$.

Based on the thus-obtained nine addition output values $q_{1,1}$, $q_{1,2}$, $q_{1,3}$, $q_{2,1}$, $q_{2,2}$, $q_{2,3}$, $q_{3,1}$, $q_{3,2}$, and $q_{3,3}$, the pixel value of each pixel in the unit area to be ultimately obtained can be determined. Namely, the pixel values $p_{1,1}$ to $p_{3,3}$ of pixels $G_{1,1}$ to $G_{3,3}$, respectively, in the unit area are calculated.

For example, among the areas on the image sensor indicated by arrows A51 to A59, the hatched areas are areas where light is incident, and the non-hatched areas are areas where light is not incident. In this example, light is incident on the whole area of pixel $G_{1,1}$ and on half of the areas of pixels $G_{1,2}$ and $G_{2,1}$, respectively.

Therefore, for the binning area indicated by arrow A51, the addition output value $q_{1,1}$ is the value of the light components incident on pixels $G_{1,1}$, $G_{1,2}$, and $G_{2,1}$. Similarly, for the binning areas indicated by arrows A52, A56, and A59, the addition output values $q_{1,2}$, $q_{2,3}$, and $q_{3,3}$ are the value of the light components incident on pixels $G_{1,1}$, $G_{1,2}$, and $G_{2,1}$.

Further, for the binning areas indicated by arrows A53 and A57, the addition output values $q_{1,3}$ and $q_{3,1}$ are the value of the light component incident on pixel $G_{1,2}$. For the binning areas indicated by arrows A54 and A58, the addition output values $q_{2,1}$ and $q_{3,2}$ are the value of the light component incident on pixel $G_{2,1}$. In addition, for the binning areas indicated by arrow A55, since no light is incident on the binning area, no light component is included in the addition output value $q_{2,2}$.

Thus, even if the unit area is an area including 3 pixels×3 pixels, using the respective addition output value $q_{i,j}$ (wherein i=1 to 3, and j=1 to 3), the respective pixel value $p_{i,j}$ can be obtained. Specifically, the simultaneous equation shown in the following formula (6) can be obtained from the respective addition output value $q_{i,j}$ (wherein i=1 to 3, and j=1 to 3).

[Formula 6]

$$q_{1,1}=w_{11}p_{1,1}+w_{12}p_{1,2}+w_{13}p_{1,3}+w_{14}p_{2,1}+w_{15}p_{2,2}+w_{16}p_{2,3}+w_{17}p_{3,1}+w_{18}p_{3,2}+w_{19}p_{3,3}$$

$$q_{1,2}=w_{21}p_{1,1}+w_{22}p_{1,2}+w_{23}p_{1,3}+w_{24}p_{2,1}+w_{25}p_{2,2}+w_{26}p_{2,3}+w_{27}p_{3,1}+w_{28}p_{3,2}+w_{29}p_{3,3}$$

$$q_{1,3}=w_{31}p_{1,1}+w_{32}p_{1,2}+w_{33}p_{1,3}+w_{34}p_{2,1}+w_{35}p_{2,2}+w_{36}p_{2,3}+w_{37}p_{3,1}+w_{38}p_{3,2}+w_{39}p_{3,3}$$

$$q_{2,1}=w_{41}p_{1,1}+w_{42}p_{1,2}+w_{43}p_{1,3}+w_{44}p_{2,1}+w_{45}p_{2,2}+w_{46}p_{2,3}+w_{47}p_{3,1}+w_{48}p_{3,2}+w_{49}p_{3,3}$$

$$q_{2,2}=w_{51}p_{1,1}+w_{52}p_{1,2}+w_{53}p_{1,3}+w_{54}p_{2,1}+w_{55}p_{2,2}+w_{56}p_{2,3}+w_{57}p_{3,1}+w_{58}p_{3,2}+w_{59}p_{3,3}$$

$$q_{2,3}=w_{61}p_{1,1}+w_{62}p_{1,2}+w_{63}p_{1,3}+w_{64}p_{2,1}+w_{65}p_{2,2}+w_{66}p_{2,3}+w_{67}p_{3,1}+w_{68}p_{3,2}+w_{69}p_{3,3}$$

$$q_{3,1}=w_{71}p_{1,1}+w_{72}p_{1,2}+w_{73}p_{1,3}+w_{74}p_{2,1}+w_{75}p_{2,2}+w_{76}p_{2,3}+w_{77}p_{3,1}+w_{78}p_{3,2}+w_{79}p_{3,3}$$

$$q_{3,2}=w_{81}p_{1,1}+w_{82}p_{1,2}+w_{83}p_{1,3}+w_{84}p_{2,1}+w_{85}p_{2,2}+w_{86}p_{2,3}+w_{87}p_{3,1}+w_{88}p_{3,2}+w_{89}p_{3,3}$$

$$q_{3,3}=w_{91}p_{1,1}+w_{92}p_{1,2}+w_{93}p_{1,3}+w_{94}p_{2,1}+w_{95}p_{2,2}+w_{96}p_{2,3}+w_{97}p_{3,1}+w_{98}p_{3,2}+w_{99}p_{3,3} \quad (6)$$

In formula (6), similar to the case of formula (1), each addition output value $q_{i,j}$ gives the same weighting to the pixel value $p_{i,j}$ for all of the pixels in the unit area. $w_{s,t}$ (wherein s=1 to 9, and t=1 to 9) in formula (6) represents the weighting for each pixel value $p_{i,j}$.

When pixel $G_{i,j}$ is used in the calculation of addition output value $q_{i,j}$, the weighting $w_{s,t}$ of each these pixel values $p_{i,j}$ is set as "1", and when pixel $G_{i,j}$ is not used in the calculation of addition output value $q_{i,j}$, the weighting $w_{s,t}$ of each these pixel values $p_{i,j}$ is set as "0".

Therefore, if the matrix obtained by arranging the weighting $w_{s,t}$ shown in formula (6) in the manner in formula (7) is a weighting matrix w, by solving the above formula (3) or formula (4), the pixel value $p_{i,j}$ of each pixel can be obtained.

[Formula 7]

$$\begin{bmatrix} w_{11} & w_{12} & w_{13} & w_{14} & w_{15} & w_{16} & w_{17} & w_{18} & w_{19} \\ w_{21} & w_{22} & w_{23} & w_{24} & w_{25} & w_{26} & w_{27} & w_{28} & w_{29} \\ w_{31} & w_{32} & w_{33} & w_{34} & w_{35} & w_{36} & w_{37} & w_{38} & w_{39} \\ w_{41} & w_{42} & w_{43} & w_{44} & w_{45} & w_{46} & w_{47} & w_{48} & w_{49} \\ w_{51} & w_{52} & w_{53} & w_{54} & w_{55} & w_{56} & w_{57} & w_{58} & w_{59} \\ w_{61} & w_{62} & w_{63} & w_{64} & w_{65} & w_{66} & w_{67} & w_{68} & w_{69} \\ w_{71} & w_{72} & w_{73} & w_{74} & w_{75} & w_{76} & w_{77} & w_{78} & w_{79} \\ w_{81} & w_{82} & w_{83} & w_{84} & w_{85} & w_{86} & w_{87} & w_{88} & w_{89} \\ w_{91} & w_{92} & w_{93} & w_{94} & w_{95} & w_{96} & w_{97} & w_{98} & w_{99} \end{bmatrix} = \quad (7)$$

$$\begin{bmatrix} 1 & 1 & 1 & 1 & 1 & 1 & 1 & 1 & 1 \\ 1 & 1 & 0 & 1 & 1 & 0 & 0 & 0 & 0 \\ 0 & 1 & 1 & 0 & 1 & 1 & 0 & 0 & 0 \\ 0 & 0 & 0 & 1 & 1 & 0 & 1 & 1 & 0 \\ 0 & 0 & 0 & 0 & 1 & 1 & 0 & 1 & 1 \\ 1 & 1 & 1 & 1 & 1 & 1 & 0 & 0 & 0 \\ 0 & 1 & 1 & 0 & 1 & 1 & 0 & 1 & 1 \\ 0 & 0 & 0 & 1 & 1 & 1 & 1 & 1 & 1 \\ 1 & 1 & 0 & 1 & 1 & 0 & 1 & 1 & 0 \end{bmatrix} = w$$

Further, in such a case, the horizontal vector in which the addition output values $q_{1,1}$, $q_{1,2}$, $q_{1,3}$, $q_{2,1}$, $q_{2,2}$, $q_{2,3}$, $q_{3,1}$, $q_{3,2}$, and $q_{3,3}$ are arranged in order is used as a matrix q. In addition, the horizontal vector in which the pixel values $p_{1,1}$, $p_{1,2}$, $p_{1,3}$, $p_{2,1}$, $p_{2,2}$, $p_{2,3}$, $p_{3,1}$, $p_{3,2}$, and $p_{3,3}$ are arranged in order is used as a matrix p.

Therefore, the following formula (8) can be obtained by performing the calculation of formula (4) in the example illustrated in FIG. 2. Based on the calculation of this formula (8), the pixel value $p_{i,j}$ (wherein i=1 to 3, and j=1 to 3) that is the ultimate determination target is obtained.

[Formula 8]

$$p_{1,1} = q_{1,1} + q_{2,2} - q_{3,1} - q_{3,2}$$

$$p_{1,2} = -q_{1,1} - q_{2,1} - q_{2,2} + q_{3,1} + q_{3,2} + q_{3,3}$$

$$p_{1,3} = q_{1,1} + q_{2,1} + q_{3,2} - q_{3,3}$$

$$p_{2,1} = -q_{1,1} - q_{1,3} - q_{2,2} + q_{2,3} + q_{3,1} + q_{3,2}$$

$$p_{2,2} = q_{1,1} + q_{1,2} + q_{1,3} + q_{2,1} + q_{2,2} - q_{2,3} - q_{3,1} - q_{3,2} - {}_{3,3}$$

$$p_{2,3} = -q_{1,1} - q_{1,2} - q_{2,1} + q_{2,3} + q_{3,2} + q_{3,3}$$

$$p_{3,1} = q_{1,1} + q_{1,3} - q_{2,3} - q_{3,1}$$

$$p_{3,2} = -q_{1,1} - q_{1,2} - q_{1,3} + q_{2,3} + q_{3,1} + q_{3,3}$$

$$p_{3,3} = q_{1,1} + q_{1,2} - q_{2,3} - q_{3,3} \quad (8)$$

Note that the combinations of the pixels forming the area serving as the unit area and the binning areas, for example, may be determined in an arbitrary manner. However, the following description will be based on the 2 pixel×2 pixel area illustrated in FIG. 1 as the unit area, and the areas indicated by the arrows A21 to A24 as the binning areas.

[Image Processing Apparatus Configuration Example]

Figure 3:
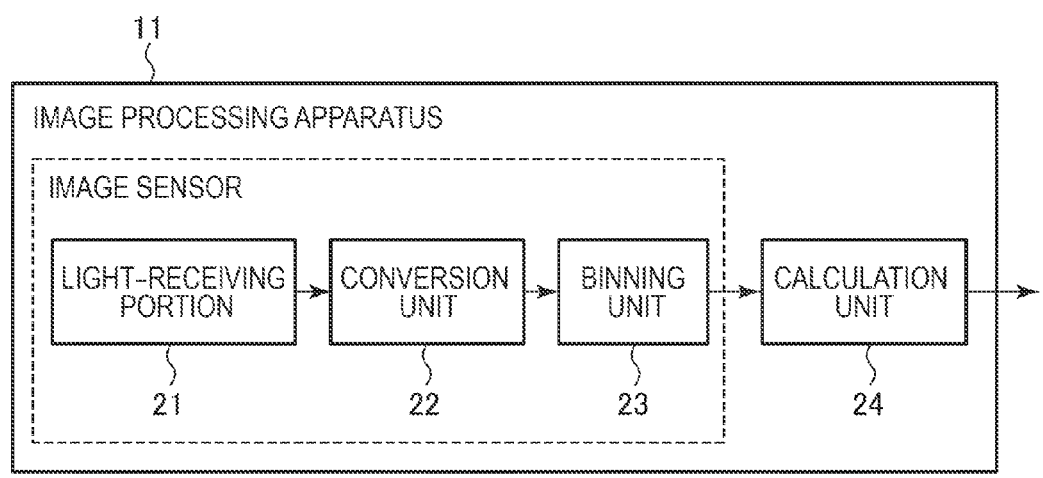
FIG. 3 is a diagram illustrating a configuration example of an image processing apparatus.
Figure 4:
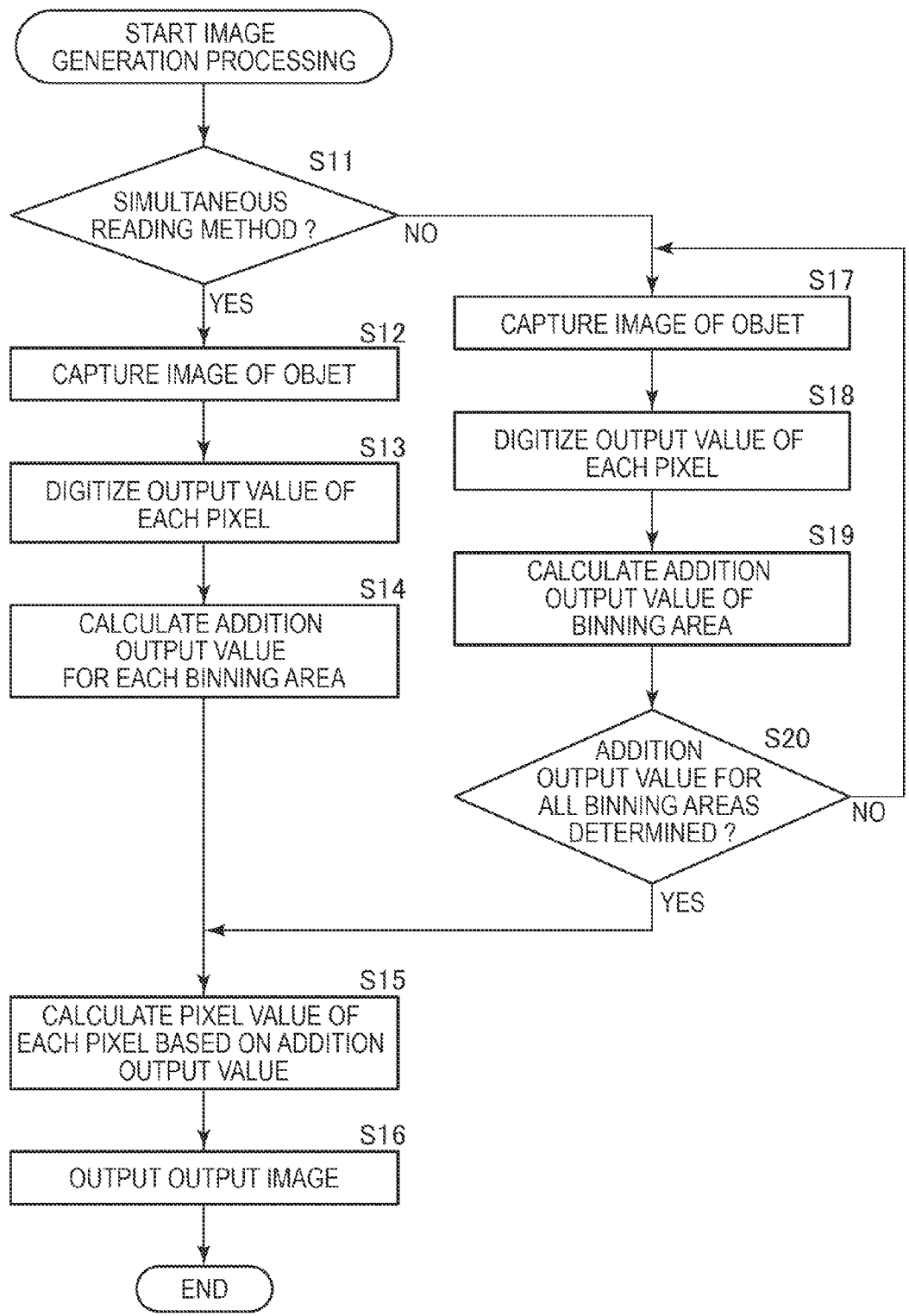
FIG. 4 is a flowchart illustrating image generation processing.

Next, a specific embodiment to which the present technology is applied will be described. FIG. 3 is a diagram illustrating a configuration example of an embodiment of an image processing apparatus to which the present technology is applied.

An image processing apparatus 11 illustrated in FIG. 3 is configured from a light-receiving portion 21, a conversion unit 22, a binning unit 23, and a calculation unit 24.

The light-receiving portion 21, which is formed from pixels that receive and photoelectrically convert light incident from an object, and output an electric signal based on the strength of the received light, supplies an electric signal (output value) obtained from each pixel to the conversion unit 22. For example, in the example illustrated in FIG. 1, the area including the four pixels $G_{1,1}$, $G_{1,2}$, $G_{2,1}$, and $G_{2,2}$ provided on the light-receiving portion 21 serves as one unit area, and a plurality of unit areas are provided on the light-receiving portion 21. Namely, the light-receiving portion 21 is divided into a plurality of unit areas.

The data from the electric signal (output value) output from each pixel of the light-receiving portion 21 is an image signal of an image captured by the light-receiving portion 21.

The conversion unit 22 converts the electric signals supplied from each of the pixels of the light-receiving portion 21 from an analog signal into a digital signal, and supplies the converted signals to the binning unit 23. For example, the conversion unit 22 is configured from a plurality of A/D (analog/digital) conversion circuits provided for each pixel of the light-receiving portion 21. Each A/D conversion circuit digitizes the output value supplied from the connected pixel, and outputs the digitized value to the binning unit 23.

The binning unit 23 calculates the addition output value of each binning area determined for the unit area based on the output value of each pixel supplied from the conversion unit 22, and supplies the calculated value to the calculation unit 24.

The calculation unit 24 is configured from a plurality of adders. For example, in the example illustrated in FIG. 1, an A/D conversion circuit as the conversion unit 22 is provided for each of the four pixels in the unit area serving as the light-receiving portion 21. Each of these four A/D conversion circuits is connected to one adder as the binning unit 23. Each adder records the weighting matrix w shown in formula (2), calculates the addition output value from the output value of each pixel supplied from the A/D conversion circuit based on this weighting matrix w, and supplies the calculated value to the calculation unit 24.

Further, the light-receiving portion 21, conversion unit 22, and binning unit 23 are provided on one image sensor, such as a CCD (charge-coupled device). Note that the conversion unit 22 and the binning unit 23 may also be provided externally to the image sensor.

The calculation unit 24 calculates the pixel value of each pixel based on the addition output value of the binning area for the unit area supplied from the binning unit 23, and outputs the thus-obtained image signal of the output image.

[Description of Image Generation Processing]

In the image processing apparatus 11, the output image can be obtained by either a simultaneous reading method that outputs the addition output value of each binning area by capturing an image of the object once, or a successive reading method that captures an image of the object for each binning area and then outputs the addition output value.

For example, in the example illustrated in FIG. 1, in a simultaneous reading method, based on each of the output values (pixel values) supplied at the same time from the four pixels $G_{1,1}$ to $G_{2,2}$ of the light-receiving portion 21, the binning unit 23 performs the calculation of formula (1), and outputs the addition output values $q_{1,1}$ $q_{2,2}$. Namely, in the simultaneous reading method, the addition output values $q_{1,1}$ to $q_{2,2}$ are simultaneously calculated based on the pixel values output from each pixel at the same time.

In contrast, in the successive reading method, for example, first the binning unit 23 calculates only the addition output value $q_{1,1}$ by performing the calculation of formula (1) based on each of the pixel values supplied from the four pixels $G_{1,1}$ to $G_{2,2}$ of the light-receiving portion 21. Then, the binning unit 23 calculates only the addition output value $q_{1,2}$ by performing the calculation of formula (1) based on each of the pixel values supplied from the four pixels $G_{1,1}$ to $G_{2,2}$ of the light-receiving portion 21 at the next time instant.

Next, the binning unit 23 subsequently calculates only the addition output value $q_{2,1}$ by performing the calculation of formula (1) based on each of the pixel values supplied from the four pixels $G_{1,1}$ to $G_{2,2}$ of the light-receiving portion 21. After that, the binning unit 23 further subsequently calculates only the addition output value $q_{2,2}$ by performing the calculation of formula (1) based on each of the pixel values supplied from the four pixels $G_{1,1}$ to $G_{2,2}$ of the light-receiving portion 21.

Thus, in the successive reading method, each addition output value is calculated based on pixel values output from each pixel at different time instants to each other. Namely, an image is captured of the object the same number of times that an addition output value is output. For example, in the example illustrated in FIG. 1, image capturing is carried out four times, so that an addition output value of each binning area indicated by arrows A21 and A22 is obtained.

Next, the image processing performed by the image processing apparatus 11 will be described. This image processing is started when an instruction to generate an output image is issued by the user.

In step S11, the image processing apparatus 11 determines whether to generate an output image based on the simultaneous reading method.

If it is determined in step S11 to generate an output image based on the simultaneous reading method, in step S12, the image sensor captures an image of the object. Namely, each of the pixels forming the light-receiving portion 21 photoelectrically converts light incident from the object, and the output values obtained from those results are supplied to the conversion unit 22.

In step S13, the conversion unit 22 digitizes the output value of each pixel supplied from the light-receiving portion 21, and supplies the digitized value to the binning unit 23.

In step S14, the binning unit 23 calculates an addition output value for each binning area determined for the unit area based on the output value of each pixel supplied from the conversion unit 22, and supplies the calculated value to the calculation unit 24.

For example, the binning unit 23 simultaneously calculates addition output values $q_{1,1}$ to $q_{2,2}$ by performing the calculation of formula (1) based on a predetermined weighting matrix w and the output value of each pixel. Note that in the calculation performed in step S14, the actual output value obtained from each pixel of the light-receiving portion 21 is substituted for the pixel value $p_{i,j}$.

In step S15, the calculation unit 24 calculates the pixel value $p_{i,j}$ (wherein i=1 to 2, and j=1 to 2) of each pixel in the output image based on each addition output value $q_{i,j}$ (wherein i=1 to 2, and j=1 to 2) supplied from the binning unit 23.

For example, the calculation unit 24 calculates the pixel value $p_{i,j}$ by performing the calculation of formula (4) based on each addition output value $q_{i,j}$ and a matrix $w^{-1}$ recorded in advance.

In step S16, the calculation unit 24 outputs the output image, more specifically the image signal of the output image, formed from the pixel value $p_{i,j}$ of each pixel obtained from the processing performed in step S15, and then the image generation processing finishes.

Further, if it is determined in step S11 to not generate an output image based on the simultaneous reading method, namely, to generate the output image based on the successive reading method, the processing proceeds to step S17.

In step S17, the image sensor captures an image of the object. Namely, each of the pixels forming the light-receiving portion 21 photoelectrically converts light incident from the object, and the output values obtained from those results are supplied to the conversion unit 22.

In step S18, the conversion unit 22 digitizes the output value of each pixel supplied from the light-receiving portion 21, and supplies the digitized value to the binning unit 23.

In step S19, the binning unit 23 calculates an addition output value for one binning area determined for the unit area based on the output value of each pixel supplied from the conversion unit 22, and supplies the calculated value to the calculation unit 24.

For example, although basically the same processing is performed in step S19 as in step S14, in step S19, one addition output value not yet calculated from among $q_{1,1}$ to $q_{2,2}$ is calculated.

In step S20, the image processing apparatus 11 determines whether the addition output value for all binning areas has been determined.

For example, if the addition output values for the four binning areas indicated by the respective arrows A21 to A24 in FIG. 1 have been calculated, the image processing apparatus 11 determines that the addition output value for all binning areas has been determined.

If it is determined in step S20 that the addition output value for all binning areas has not yet been determined, the processing returns to step S17, and the above-described processing is repeated. Namely, an addition output value of the binning area to be processed is calculated from the output value of each pixel obtained from the next image capture process.

More specifically, when an image of the object is captured and the output value of each pixel is output from the light-receiving portion 21, the next image capture process is started at the light-receiving portion 21.

On the other hand, if it is determined in step S20 that the addition output value for all binning areas has been determined, the processing proceeds to step S15. Then, the processing of steps S15 and S16 is performed, and the image generation processing finishes.

As described above, the image processing apparatus 11 determines an addition output value for a plurality of determined binning areas for a unit area, and calculates the ultimate pixel value of each pixel from those addition output values. Thus, by determining the pixel value of each pixel from the addition output value, noise can be easily reduced and the S/N ratio can be improved even for a compact and inexpensive image sensor.

Meanwhile, the above-described series of processes may be performed by hardware or software. When the series of processes is performed by the software, programs constituting the software are installed in a computer. Here, the computer includes a computer incorporated into dedicated hardware, or, for example, a general purpose personal computer or the like which can execute various functions by installing various kinds of programs.

Figure 5:
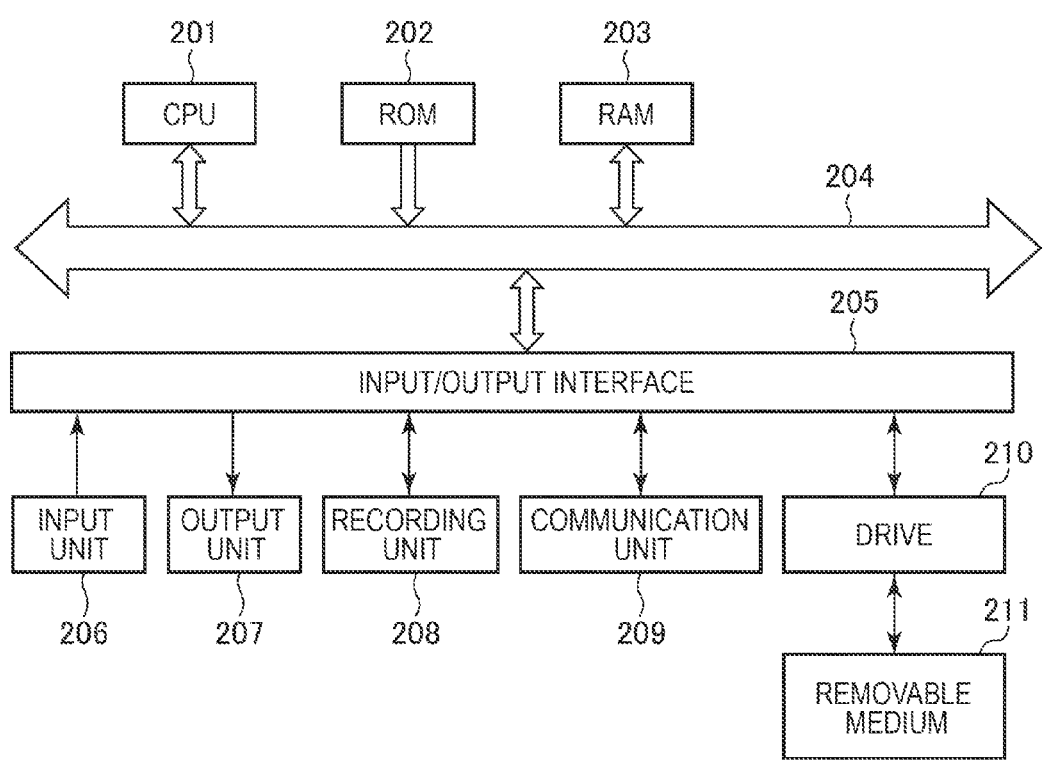
FIG. 5 is a diagram illustrating a configuration example of a computer.

FIG. 5 is a block diagram illustrating a hardware configuration example of a computer which executes the series of processes using a program.

In the computer, a CPU (Central Processing Unit) 201, a ROM (Read Only Memory) 202, and a RAM (Random Access Memory) 203 are connected to each other via a bus 204.

An input/output interface 205 is further connected to the bus 204. The input/output interface 205 is connected to an input unit 206, an output unit 207, a recording unit 208, a communication unit 209, and a drive 210.

The input unit 206 may include a keyboard, a mouse, a microphone, an imaging element, or the like. The output unit 207 may include a display, a speaker, and the like. The recording unit 208 may include a hard disk, a nonvolatile memory, or the like. The communication unit 209 may include a network interface or the like. The drive 210 drives a removable medium 211 such as a magnetic disk, an optical disc, a magneto-optical disc, or a semiconductor memory.

In the computer with the above-described configuration, the CPU 201 loads a program recorded in, for example, the recording unit 208 to the RAM 203 via the input/output interface 205 and the bus 204 and executes the program, thereby performing the above-described series of processes.

The program executed by the computer (the CPU 201) may be recorded, for example, on the removable medium 211 which is a package medium. In addition, the program may be provided via wired or wireless transmission media such as a local area network, the Internet, and digital satellite broadcasting.

In the computer, when the removable medium 211 is mounted on the drive 210, the program may be installed to the recording unit 208 via the input/output interface 205. In addition, the program may be received by the communication unit 209 via a wired or wireless transmission media and may be installed to the recording unit 208. Further, the program may be installed to the ROM 202 or the recording unit 208 in advance.

The program executed by the computer may be a program for executing the processes on a time-sequential basis in the order described herein. Alternatively, it may be a program for executing the processes in parallel or at timing when the process is necessary, e.g., when a process call is made.

It should be understood by those skilled in the art that various modifications, combinations, sub-combinations and alterations may occur depending on design requirements and other factors insofar as they are within the scope of the appended claims or the equivalents thereof.

For example, the embodiments of the present technology may employ cloud computing in which a single function is distributed to a plurality of devices via a network and is processed in cooperation.

In addition, each step described in the above flowchart may be not only executed by a single device, but may also be distributed to a plurality of devices and be executed.

Further, in a case where a single step includes a plurality of processes, the plurality of processes included in the step may be not only executed by a single device, but may also be distributed to a plurality of devices and be executed.

Additionally, the present technology may also be configured as below.

[1]
An image processing apparatus including:
a binning unit configured to calculate, based on, as a binning area, an area including two or more adjacent pixels in a unit area including m pixels in a lateral direction and n pixels in a perpendicular direction on an image sensor, a sum of output values of the pixels in the binning area as an addition output value for each of m×n binning areas that are different to each other; and
a calculation unit configured to calculate a pixel value of each pixel in the binning area based on m×n addition output values obtained for the unit area.

[2]
The image processing apparatus according to [1], wherein the calculation unit is configured to calculate the pixel value of each pixel in the unit area by calculating q=wp, where a matrix obtained by arranging the m×n addition output values is q, a matrix obtained by arranging the pixel value of each pixel in the unit area is p, and a matrix obtained by arranging a weighting of each pixel in the unit area is w.

[3] The image processing apparatus according to [2], wherein the calculation unit is configured to calculate the pixel value of each pixel in the unit area by calculating $p=w^{-1}q$, where $w^{-1}$ is an inverse matrix of the matrix w.

[4] The image processing apparatus according to [2] or [3], wherein the matrix w is a matrix obtained by setting a weighting of pixels used to determine the addition output values as 1, and a weighting of pixels not used to determine the addition output values as 0.

[5] The image processing apparatus according to any one of [1] to [4], wherein the binning unit is configured to calculate the sum of digitized output values of the pixels as the addition output value.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-050212 filed in the Japan Patent Office on Mar. 7, 2012, the entire content of which is hereby incorporated by reference.

What is claimed is:

1. An image processing apparatus comprising:
a binning unit configured to calculate, based on, as a binning area, an area including two or more adjacent pixels in a unit area including m pixels in a lateral direction and n pixels in a perpendicular direction on an image sensor, a sum of output values of the pixels in the binning area as an addition output value for each of m×n binning areas that are different from each other; and
a calculation unit configured to calculate a pixel value of each pixel in the binning area based on m×n addition output values obtained for the unit area, wherein the calculation unit is configured to calculate the pixel value of each pixel in the unit area by calculating q=wp, where a matrix obtained by arranging the m×n addition output values is q, a matrix obtained by arranging the pixel value of each pixel in the unit area is p, and a matrix obtained by arranging a weighting of each pixel in the unit area is w.

2. The image processing apparatus according to claim 1, wherein the calculation unit is configured to calculate the pixel value of each pixel in the unit area by calculating $p=w^{-1}q$, where $w^{-1}$ is an inverse matrix of the matrix w.

3. The image processing apparatus according to claim 2, wherein the matrix w is a matrix obtained by setting a weighting of pixels used to determine the addition output values as 1, and a weighting of pixels not used to determine the addition output values as 0.

4. The image processing apparatus according to claim 3, wherein the binning unit is configured to calculate the sum of digitized output values of the pixels as the addition output value.

5. An image processing method comprising:
calculating, using at least one processor, based on, as a binning area, an area including two or more adjacent pixels in a unit area including m pixels in a lateral direction and n pixels in a perpendicular direction on an image sensor, a sum of output values of the pixels in the binning area as an addition output value for each of m×n binning areas that are different from each other; and
calculating, using the at least one processor, a pixel value of each pixel in the binning area based on m×n addition output values obtained for the unit area, wherein the pixel value of each pixel in the unit area is calculated by calculating q=wp, where a matrix obtained by arranging the m×n addition output values is q, a matrix obtained by arranging the pixel value of each pixel in the unit area is p, and a matrix obtained by arranging a weighting of each pixel in the unit area is w.

6. The image processing method according to claim 5, wherein the pixel value of each pixel in the unit area is calculated by calculating $p=w^{-1}q$, where $w^{-1}$ is an inverse matrix of the matrix w.

7. The image processing method according to claim 6, wherein the matrix w is a matrix obtained by setting a weighting of pixels used to determine the addition output values as 1, and a weighting of pixels not used to determine the addition output values as 0.

8. The image processing method according to claim 7, wherein the sum of digitized output values of the pixels is calculated as the addition output value.

9. A non-transitory computer readable storage medium having stored thereon instructions, which, when executed by a processor, perform an image processing method comprising:
calculating, based on, as a binning area, an area including two or more adjacent pixels in a unit area including m pixels in a lateral direction and n pixels in a perpendicular direction on an image sensor, a sum of output values of the pixels in the binning area as an addition output value for each of m×n binning areas that are different from each other; and calculating a pixel value of each pixel in the binning area based on m×n addition output values obtained for the unit area, wherein the pixel value of each pixel in the unit area is calculated by calculating q=wp, where a matrix obtained by arranging the m×n addition output values is q, a matrix obtained by arranging the pixel value of each pixel in the unit area is p, and a matrix obtained by arranging a weighting of each pixel in the unit area is w.

10. The non-transitory computer readable storage medium according to claim 9, wherein the pixel value of each pixel in the unit area is calculated by calculating $p=w^{-1}q$, where $^{-1}$ is an inverse matrix of the matrix w.

11. The non-transitory computer readable storage medium according to claim 10, wherein the matrix w is a matrix obtained by setting a weighting of pixels used to determine the addition output values as 1, and a weighting of pixels not used to determine the addition output values as 0.

12. The non-transitory computer readable storage medium according to claim 11, wherein the sum of digitized output values of the pixels is calculated as the addition output value.

* * * * *